United States Patent
Lokhandwala et al.

(10) Patent No.: US 12,549,487 B2
(45) Date of Patent: Feb. 10, 2026

(54) RECEIVER-BASED TRAFFIC SCHEDULING FOR INCAST CONGESTION MANAGEMENT IN HIGH-PERFORMANCE AI/ML NETWORKS

(71) Applicant: META PLATFORMS, INC., Menlo Park, CA (US)

(72) Inventors: Zeeshan Altaf Lokhandwala, Redwood City, CA (US); Arvind Srinivasan, San Jose, CA (US)

(73) Assignee: META PLATFORMS, INC., Menlo Park, CA (US)

(*) Notice: Subject to any disclaimer, the term of this patent is extended or adjusted under 35 U.S.C. 154(b) by 426 days.

(21) Appl. No.: 18/103,394

(22) Filed: Jan. 30, 2023

(65) Prior Publication Data

US 2024/0259318 A1 Aug. 1, 2024

(51) Int. Cl.
*H04L 47/22* (2022.01)
*G06F 15/173* (2006.01)
*H04L 47/52* (2022.01)

(52) U.S. Cl.
CPC ...... *H04L 47/225* (2013.01); *G06F 15/17331* (2013.01); *H04L 47/52* (2013.01)

(58) Field of Classification Search
CPC ......... H04L 47/22; H04L 47/52; H04L 47/10; H04L 47/11; H04L 47/12; H04L 47/24; H04L 47/26; H04L 47/27; H04L 47/30; H04L 47/43; H04L 47/62; H04L 67/10; H04L 12/80; H04L 12/83; H04L 12/85; G06F 15/17; G06F 15/16; G06F 13/16; G06F 13/42; G06F 12/08
USPC ......................................................... 370/389
See application file for complete search history.

(56) References Cited

U.S. PATENT DOCUMENTS

| | | | | |
|---|---|---|---|---|
| 7,016,971 | B1* | 3/2006 | Recio | H04L 47/26 709/233 |
| 7,076,569 | B1* | 7/2006 | Bailey | H04L 69/326 710/39 |
| 7,330,477 | B2* | 2/2008 | Hendel | H04L 47/56 370/429 |
| 9,871,734 | B2* | 1/2018 | Kagan | H04L 47/2408 |
| 9,965,441 | B2* | 5/2018 | Sajeepa | G06F 13/28 |
| 10,454,991 | B2* | 10/2019 | Bloch | G06F 9/45558 |
| 10,944,660 | B2* | 3/2021 | Hurson | H04L 47/115 |
| 11,476,928 | B2* | 10/2022 | Levi | H04W 72/0446 |
| 2005/0122957 | A1* | 6/2005 | Ambe | H04L 12/4641 370/351 |
| 2008/0298248 | A1* | 12/2008 | Roeck | H04L 49/505 370/237 |
| 2022/0141137 | A1* | 5/2022 | Lin | H04L 47/26 370/235 |

(Continued)

*Primary Examiner* — Man U Phan
(74) *Attorney, Agent, or Firm* — EVERSHEDS SUTHERLAND (US) LLP

(57) ABSTRACT

A system for Remote Direct Memory Access incast congestion management is provided. The system may access one or more receive work queue entities (RWQEs) associated with one or more send work queue entities (SWQEs), determine a transmission rate based on an available bandwidth and a number of transmitter devices associated with the one or more SWQEs, and transmit a rate control notification (RCN) message to a transmitter device associated with a send work queue entity of the one or more SWQEs, wherein the rate control notification message comprises the determined transmission rate.

17 Claims, 4 Drawing Sheets

(56) References Cited

U.S. PATENT DOCUMENTS

2024/0187482 A1\* 6/2024 Belkar ................... G06F 13/28
2024/0396839 A1\* 11/2024 Friedman ................ H04L 47/11

\* cited by examiner

RECEIVER-BASED TRAFFIC SCHEDULING FOR INCAST CONGESTION MANAGEMENT IN HIGH-PERFORMANCE AI/ML NETWORKS

TECHNICAL FIELD

The present description generally relates to computer networks and, more particularly, to systems, apparatuses, methods, and computer program products regarding receiver-based traffic scheduling for incast congestion management in high-performance artificial intelligence and machine learning networks.

BACKGROUND

Remote Direct Memory Access (RDMA) allows for direct access of memory from one device to the memory of another device. RDMA may help increase the efficiency of data centers by providing low-latency and high-throughput data transfers. High-performance artificial intelligence (AI) and machine learning (ML) applications may utilize high-bandwidth network communication and predictable tail latency. Incast congestion may happen in high-bandwidth, low-latency AI/ML networks when multiple synchronized AI/ML accelerators send data to the same AI/ML accelerator in parallel. This may result in buffer buildup, congestion spreading, packet drops, and increasing the tail latency for data transfers. Therefore, there is a need to manage incast congestion in high-performance AI/ML applications.

BRIEF SUMMARY

An aspect of the present disclosure includes a method that includes accessing one or more receive work queue entities (RWQEs) associated with one or more send work queue entities (SWQEs), determining a transmission rate based on an available bandwidth and a number of transmitter devices associated with the one or more SWQEs, and transmitting a rate control notification (RCN) message to a transmitter device associated with a send work queue entity of the one or more SWQEs, wherein the rate control notification message comprises the determined transmission rate.

Another aspect of the present disclosure includes a system comprising at least one device comprising one or more processors and at least one memory storing instructions. Executing the instructions by the one or more processors causes the apparatus to access one or more receive work queue entities (RWQEs) associated with one or more send work queue entities (SWQEs), determine a transmission rate based on an available bandwidth and a number of transmitter devices associated with the one or more SWQEs, and transmit a rate control notification (RCN) message to a transmitter device associated with a send work queue entity of the one or more SWQEs, wherein the rate control notification message comprises the determined transmission rate.

Yet another aspect of the present disclosure includes a computer-readable medium storing instructions. When the instructions are executed by one or more processors, the one or more processors may perform operations that include accessing one or more receive work queue entities (RWQEs) associated with one or more send work queue entities (SWQEs), determining a transmission rate based on an available bandwidth and a number of transmitter devices associated with the one or more SWQEs, and transmitting a rate control notification (RCN) message to a transmitter device associated with a send work queue entity of the one or more SWQEs, wherein the rate control notification message comprises the determined transmission rate.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more other embodiments of the subject technology. In one or more embodiments of the subject technology, structures and components are shown in block diagram form in order to avoid obscuring the concepts of the subject technology.

As defined herein, a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, an incast(s) may refer to a connection to a receiver.

As referred to herein, incast congestion may refer to network backpressure, which may occur when a receiver is unable to receive data as fast as it is being sent to the receiver.

As referred to herein, a work queue entity, may refer to a queue that allows applications to submit work requests directly to network hardware.

As referred to herein, a receive work queue entity may refer to a receiving end of a work queue.

As referred to herein, a send work queue entity may refer to a sending end of a work queue.

High-performance AI applications utilize high-bandwidth network communication along with predictable tail latency. Congestion on the network directly affects the tail latencies and thereby affects the performance of the end applications. Approaches for maximizing performance and reducing tail latency on the network include per packet load balancing to mitigate congestion hotspots on a switch fabric, efficient data loss recovery to recover any lost network packets in the event of transient congestion, and incast avoidance at the receiver to prevent buffer build up and packet drops at the receiving network ports.

The networks may run synchronous training applications in which various collective models may be synchronized. Data centers may comprise both frontend (FE) and backend (BE) networks. In the data centers, the synchronization may take place via FE, whereas the data may be moved through BE. The examples of the present disclosure may involve improving congestion control on the BE to solve critical bottlenecks by reducing incast congestion.

Figure 1:
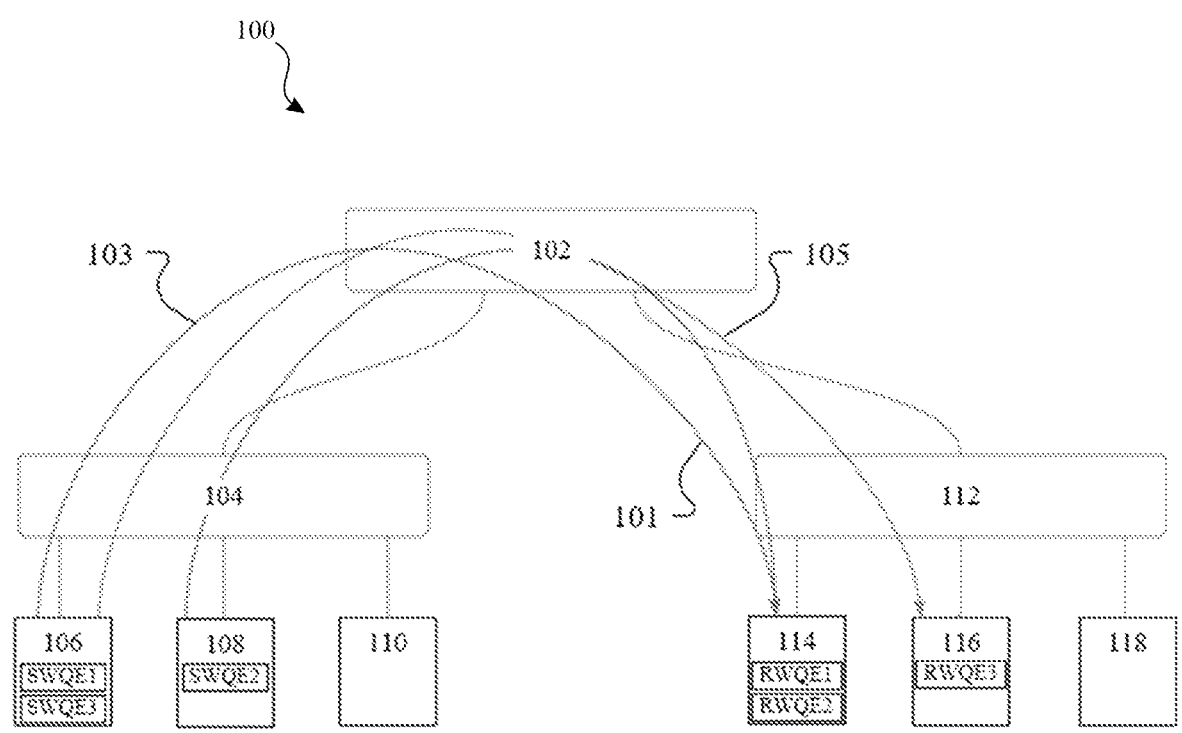
FIG. 1 illustrates an example network environment, in accordance with one or more embodiments of the present disclosure.

FIG. 1 illustrates a network environment 100, in accordance with one or more embodiments of the present disclosure. The network environment 100 may include a network device 102. The network device 102 may be one or more servers, switches, and/or the like that establish a connection (e.g., via wide area network (WAN) or local area network (LAN), etc.) between one or more local network devices 104, 112 that are connected to one or more computing devices 106, 108, 110, 114, 116, 118. The local network devices 104, 112 may be similar to the network device 102. For example, the local network device 104 may be a switch that connects the computing devices 106, 108, 110 such that they may communicate with each other and any other computing devices 114, 116, 118 that are connected to the same network device 102 (directly or indirectly (e.g., via local network devices 104, 112)).

The computing devices 106, 108, 110, 114, 116, 118 may be any kind of AI/ML accelerators, such as graphics processing units (GPUs) or neural processing units (NPUs). The computing devices 106, 108, 110, 114, 116, 118 may include or be associated with a network interface card (NIC) configured to implement an RDMA engine for performing RDMA communications. RDMA communications may include three types of queues: send, receive, and completion. The send and receive queue may be generated in pairs. For example, the RDMA engine may be based on a networking protocol that allows RDMA over an Ethernet network, which may be on the Ethernet level or the Internet level.

As shown in the network environment 100, the computing device 106 sends data to the computing devices 114, 116. However, the computing device 114 has multiple incasts 101, 103, receiving data from both the computing devices 106, 108. As such, communications from the computing device 106 to the computing device 114 may have a lower transmission rate than communications from the computing device 106 to the computing device 116, which may have one incast 105 for example. The examples of the present disclosure may orchestrate the transmission bandwidth between transmitters and receivers based on the receiver's incasts (e.g., incasts 101, 103, 105 from computing devices 106, 108), which may manage potential congestion and allow for high-performance AI/ML systems to scale more effectively than other approaches.

Figure 2:
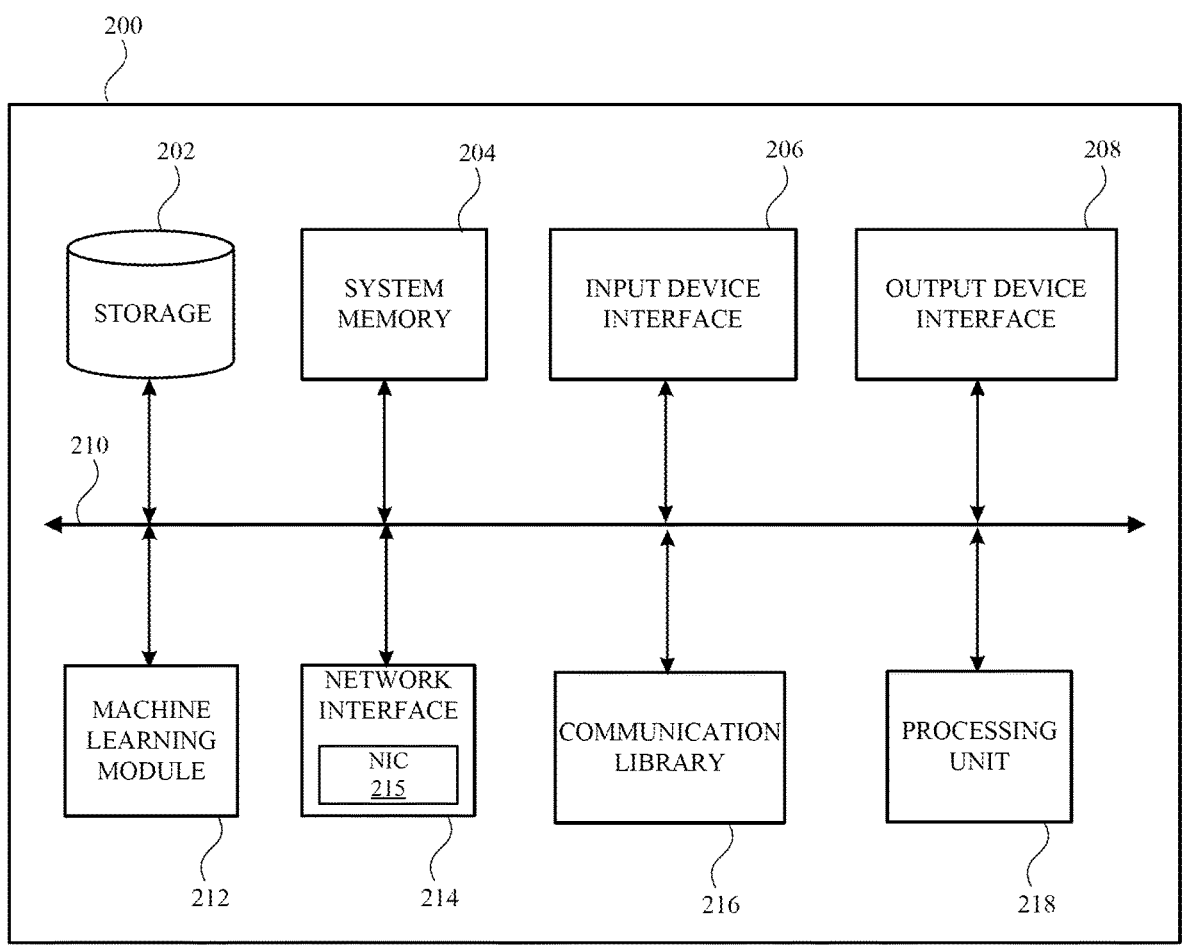
FIG. 2 illustrates an example accelerator, in accordance with one or more embodiments of the present disclosure.

FIG. 2 illustrates an example computing device 200, in accordance with one or more embodiments of the subject technology. The computing device 200 may be, and/or may be a part of, an accelerator for AI/ML applications (e.g., GPUs, field-programmable gate arrays (FPGAs), application-specific integrated circuits (ASICs)). The computing device 200 may include various types of computer-readable media and interfaces for various other types of computer-readable media. The computing device 200 includes a bus 210, a system memory 204, a storage device 202, an input device interface 206, an output device interface 208, a machine learning module 212, a network interface 214, a communication library 216, and a processing unit 218, or subsets and variations thereof. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The bus 210 collectively represents all system, peripheral, and chipset buses that communicatively connect the numerous internal devices of the computing device 200. In one or more embodiments, the bus 210 communicatively connects the processing unit 218 with the other components of the computing device 200. From various memory units, the processing unit 218 retrieves instructions to execute and data to process in order to execute the operations of the subject disclosure. The processing unit 218 may be a controller and/or a single- or multi-core processor or processors in various embodiments.

The storage device 202 may be a read-and-write memory device. The storage device 202 may be a non-volatile memory unit that stores instructions and data (e.g., static and dynamic instructions and data) even when the computing device 200 is off. In one or more embodiments, a mass-storage device (such as a magnetic or optical disk and its corresponding disk drive) may be used as the storage device 202. In one or more embodiments, a removable storage device (such as a floppy disk, flash drive, and its corresponding disk drive) may be used as the storage device 202.

Like the storage device 202, the system memory 204 may be a read-and-write memory device. However, unlike the storage device 202, the system memory 204 may be a volatile read-and-write memory, such as random-access memory. The system memory 204 may store any of the instructions and data that one or more processing unit 218 may need at runtime to perform operations. In one or more embodiments, the processes of the subject disclosure are stored in the system memory 204 and/or the storage device 202. From these various memory units, the one or more processing unit 218 retrieves instructions to execute and data to process in order to execute the processes of one or more embodiments, discussed below. The system memory 204 may include one or more buffers. Buffers for RDMA applications may include send queues, receive queues, completion queues, work queue elements, completion queue elements, and the like.

Embodiments within the scope of the present disclosure may be partially or entirely realized using a tangible computer-readable storage medium (or multiple tangible computer-readable storage media of one or more types) encoding one or more instructions. The tangible computer-readable storage medium also may be non-transitory in nature.

The computer-readable storage medium may be any storage medium that may be read, written, or otherwise accessed by a general purpose or special purpose computing device, including any processing electronics and/or processing circuitry capable of executing instructions. For example, without limitation, the computer-readable medium may include any volatile semiconductor memory (e.g., the system memory 204), such as RAM, DRAM, SRAM, T-RAM, Z-RAM, and TTRAM. The computer-readable medium also may include any non-volatile semiconductor memory (e.g., the storage device 202), such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium may include any non-semiconductor memory, such as optical disk storage, magnetic disk storage, magnetic tape, other magnetic storage devices, or any other medium capable of storing one or more instructions. In one or more embodiments, the tangible computer-readable storage medium may be directly coupled to a computing device, while in other embodiments, the tangible computer-readable storage medium may be indirectly coupled to a computing device, e.g., via one or more wired connections, one or more wireless connections, or any combination thereof.

Instructions may be directly executable or may be used to develop executable instructions. For example, instructions may be realized as executable or non-executable machine code or as instructions in a high-level language that may be compiled to produce executable or non-executable machine code. Further, instructions also may be realized as or may include data. Computer-executable instructions also may be organized in any format, including routines, subroutines, programs, data structures, objects, modules, applications, applets, functions, etc. As recognized by those of skill in the art, details including, but not limited to, the number, structure, sequence, and organization of instructions may vary significantly without varying the underlying logic, function, processing, and output.

While the above discussion primarily refers to microprocessors or multi-core processors that execute software, one or more embodiments are performed by one or more integrated circuits, such as ASICs or FPGAs. In one or more embodiments, such integrated circuits execute instructions that are stored on the circuit itself.

The bus 210 also connects to the input device interface 206 and output device interface 208. The input device interface 206 enables the system to receive inputs. For example, the input device interface 206 allows a user to communicate information and select commands on the computing device 200. The input device interface 206 may be used with input devices such as keyboards, mice, dials, switches, sliders, and other interfaces (physical or virtual) for a user to supply information to the computing device 200. The output device interface 208 may be used with output devices such as displays, speakers, and other interfaces (physical or virtual) for the computing device 200 to provide information. One or more embodiments may include devices that function as both input and output devices, such as a touchscreen.

The computing device 200 may also include a machine learning module 212. The machine learning module 212 may be a hardware and/or software module that includes machine learning logic. Machine learning logic may be embodied in the form of computer-readable instructions and may include representation learning, feature learning, convolutional neural networks, artificial neural networks, graph neural networks, attention models, image recognition models, and the like. The machine learning module 212 may include one or more accelerators for AI/ML applications. The accelerators may be a GPU, FPGA, ASIC, and the like.

The bus 210 also couples the computing device 200 to one or more networks and/or to one or more network nodes through the network interface 214. The network interface 214 may include one or more interfaces that allow the computing device 200 to be a part of a network of computers (e.g., a local area network (LAN), a wide area network (WAN), or a network of networks (the Internet)). For example, the network interface 214 may include a network interface card (NIC) 215. In one or more embodiments, the NIC 215 may be associated with one or more accelerators of the machine learning module 212.

The computing device 200 may also contain a communication library 216. The communication library 216 may be a hardware and/or software module that facilitates the communications between the transmitter and receiver. A communication may include a work queue entity (WQE). A WQE may include a send work queue entity and a corresponding receive work queue entity. The computing device 200 receiving data via an SWQE may be referred to herein as a transmitter device or transmitter. The computing device 200 receiving data via an RWQE may be referred to herein as a receiver device or receiver. The computing device 200 may be a transmitter and/or a receiver. The communication library layer (e.g., communication library 216) may act as an interface between the application layer (e.g., software applications) and the hardware layer (e.g., network hardware). The communication library 216 may direct transmission requests to an SWQE of the computing device 200 and receive requests to an RWQE of the computing device 200.

Figure 3:
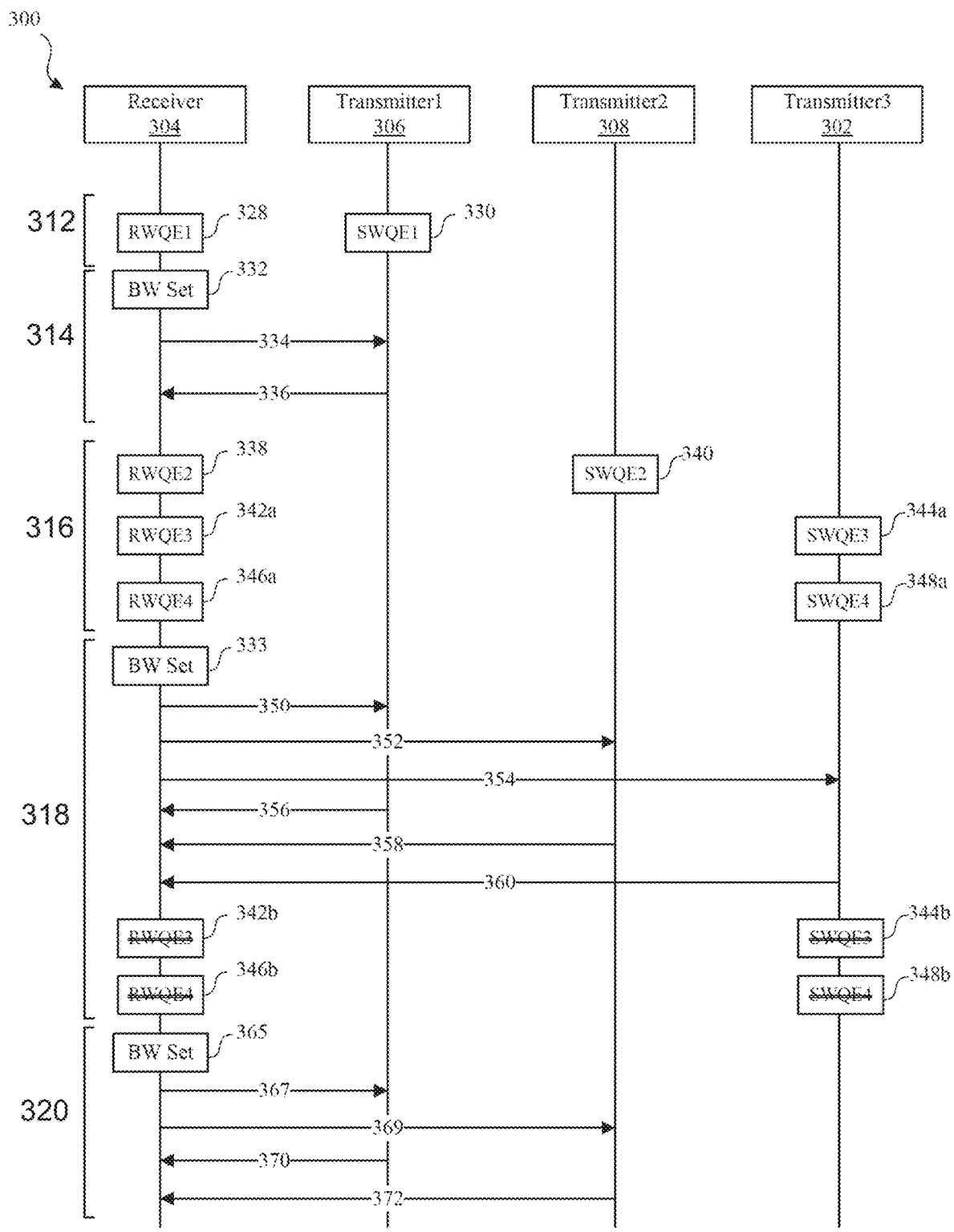
FIG. 3 illustrates a sequence diagram of an example transmission scenario, in accordance with one or more embodiments of the present disclosure.

FIG. 3 illustrates a sequence diagram of a transmission scenario 300, in accordance with one or more embodiments of the present disclosure. A receiver device 304 (e.g., the computing device 114) may have one or more incasts from transmitter1 306, transmitter2 308, transmitter3 302 (e.g., the computing devices 106, 108). The receiver device 304, transmitter1 306, transmitter2 308, and transmitter3 302 may be AI accelerators or any other device for AI/ML processing.

At time 312, the communication library (e.g., communication library 216) of the receiver device 304 may post an RWQE1 328 and the communication library of the transmitter1 306 may post an SWQE1 330 that corresponds to the RWQE1 328 at the receiver device 304. For example, an application on the receiver device 304 may notify an application on a transmitter1 306 that the receiver device 304 has data to send. The application on the receiver device 304 may post an RWQE1 328 via the receiver's communication library, and the application on the transmitter1 306 may post an SWQE1 330 via the transmitter's communication library.

At time 314, the receiver device 304 may determine and advertise a transmission rate to a transmitter1 306. Because of the posted RWQE1 328, the receiver device 304 has visibility into the associated SWQE1 330 sending data and the size of each of the messages from the transmitters. The receiver device 304 may determine the transmission rate 332 (also referred to as "bandwidth" or "BW") and advertise the transmission rate via a rate control notification packet (RCN 334), which may advertise the optimal transmission rate 322 in megabits per second (Mbps). The transmission rate 332 may be calculated as a function of NIC speed (e.g., network interface 214) and incast count (e.g., one for transmitter1 306), number of active transmitters (e.g., transmitters that include SWQEs having messages to transmit), among potentially other factors. For example, the optimal transmission rate 322 may be:

Advertised Rate (e.g., *Mbps*) =

NIC Speed (e.g., *Mbps*)/Active Transmitter Count

The RCN 334 may be transmitted separately (e.g., scheduled on a separate control queue) compared to the data messages from WQEs (e.g., RWQEs and SWQEs). However, in a scenario where an RCN 334 is unable to be sent or may be lost in travel, there may arise a need for loss recovery. Accordingly, in one or more embodiments, every data packet may have a header storing the current rate divider, which is the number of active WQEs (e.g., pair of SWQE and RWQE). The rate divider may be used to derive, based on the NIC speed of the transmitter, the transmission rate 332 that should have been included in an RCN 334. For example, the rate divider may be:

Rate Divider at Transmitter = NIC Speed/Current Transmission Rate

In an instance in which the transmitter1 306 has a transmission rate 332 for the receiver device 304, from an RCN 334 or derived from a rate divider, the transmitter1 306 may transmit 336 one or more messages of the SWQE1 330 at the transmission rate 332. Because only a single transmitter (e.g., transmitter1 306) is transmitting to the receiver device 304, the transmission rate may be set to the maximum bandwidth of the NIC (e.g., NIC 215) of the receiver device 304, which is 800 Gbps in transmission scenario 300.

At time 316, one or more applications of the receiver device 304 may post RWQE2 338, RWQE3 342a, RWQE4 346a via the receiver device's 304 communication library (e.g., communication library 216). One or more applications of the transmitter2 308 may post an SWQE2 340 that corresponds to the RWQE2 338 via the transmitter's (e.g., transmitter2 308) communication library. One or more applications of the transmitter3 302 may post SWQE3 344a, SWQE4 348a that correspond to RWQE3 342a, RWQE4 346a via the transmitter's (e.g., transmitter3 302) communication library.

At time 318, a second transmission rate 333 may be calculated by the receiver device 304 in response to the new WQEs (e.g., RWQE2 338, RWQE3 342a, RWQE4 346a). Considering the same 800 Gbps maximum transmission rate of the receiver device 304 and three active transmitters (e.g., transmitter1 306, transmitter2 308, transmitter3 302), the transmission rate is 266.66 Gbps (800 Gbps/3 transmitters=266.66 Gbps). After recalculating, the receiver device 304 may advertise the second transmission rate 333 by transmitting RCN 350, RCN 352, RCN 354, which include the second transmission rate 333, to the transmitter1 306, transmitter2 308, transmitter3 302.

When the transmitter1 306, transmitter2 308, transmitter3 302 have the second transmission rate 333—from the receiver device 304 via an RCN 350, RCN 352, and RCN 354 or derived from a rate divider—the transmitter1 306, transmitter2 308, transmitter3 302 may transmit message(s) 356, message(s) 358, message(s) 360, which include one or more messages from their respective SWQE1 330, SWQE2 340, SWQE3 344a, SWQE4 348a at the second transmission rate 333.

If any SWQE1 330, SWQE2 340, SWQE3 344a, SWQE4 348a is completed (e.g., there are no more messages left to send), the corresponding transmitter may send to the receiver device 304 an indication that the SWQE is completed. If any RWQE1 328, RWQE2 338, RWQE3 342a, RWQE4 346a is completed (e.g., it has received all the message(s) it expected to receive), the corresponding receiver may send to a transmitter (e.g., the transmitter having the SWQE corresponding to the completed RWQE) an indication that its RWQE(s) are complete (e.g., that it has received all the data). An indication may include a packet expressing the RWQE is complete or is not receiving messages for a period of time. For example, the receiver device 304 may send the transmitter3 302 an indication of completion after receiving message(s) 360 by RWQE3 342b, RWQE4 346b, respectively, at which point the transmitter3 302 may also mark the corresponding SWQE3 344b, SWQE4 348b as completed. In the example of FIG. 3, completion of the SWQEs and RWQEs are denoted by a strikethrough within the corresponding SWQEs and RWQEs (e.g., SWQE3 344b, SWQE4 348b, RWQE3 342b, RWQE3 346b). When completion is indicated, the completed SWQE3 344b, SWQE4 348b and RWQE3 342b, RWQE4 346b may no longer need a reserved bandwidth on the network and their share of bandwidth may be redistributed among the remaining WQEs.

At time 320, the receiver device 304 may calculate a third transmission rate 365 in response to the completion of WQEs. For example, after two WQEs (e.g., RWQE3 342b, RWQE4 346b) have indicated completion, the receiver device 304 may divide the maximum transmission rate between the two remaining transmitters, for example transmitter1 306, transmitter2 308). The receiver device 304 may advertise a new transmission rate of 400 Gbps to the transmitter1 306, and the transmitter2 308 via RCN 367, RCN 369, and the transmitter1 306, and the transmitter2 308 may transmit message(s) 370, message(s) 372, accordingly.

Figure 4:
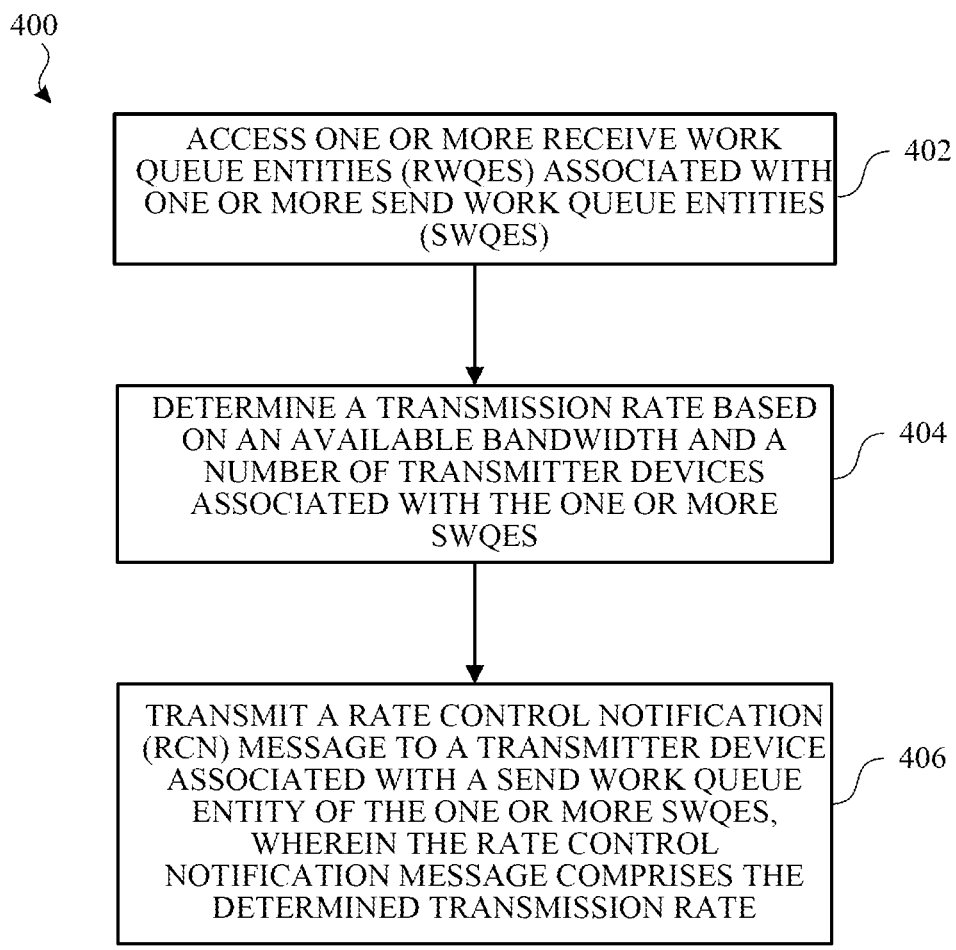
FIG. 4 illustrates a flow diagram of an exemplary process for RDMA incast congestion management, in accordance with one or more embodiments of the present disclosure.

FIG. 4 illustrates a flow diagram of a process 400 for RDMA incast congestion management, in accordance with one or more embodiments of the present disclosure. For explanatory purposes, the process 400 is primarily described herein with reference to FIGS. 1-3. However, the process 400 is not limited to the items shown in FIGS. 1-4, and one or more blocks (or operations) of the process 400 may be performed by one or more other components of other suitable devices. Further, for explanatory purposes, the blocks of the process 400 are described herein as occurring in serial or linearly. However, multiple blocks of the process 400 may occur in parallel. In addition, the blocks of the process 400 need not be performed in the order shown and/or one or more blocks of the process 400 need not be performed and/or may be replaced by other operations.

In the process 400, at block 402, a receiver device (e.g., the receiver device 304) may access (e.g., download, receive, query, or otherwise obtain) one or more receive work queue entities (e.g., RWQE1 328) associated with one or more send work queue entities (SWQEs). An RWQE may be the receiving end of an SWQE (e.g., SWQE1 330), both of which may make up a work queue entity (WQE). A communication library (e.g., communication library 216) of the receiver device may include hardware and/or software that exchanges data between the application layer and the hardware layer of the receiver device for exchanging data between other devices. The RWQE may be posted (e.g., transferred from an upper layer, such as an application layer, to a lower layer, such as a hardware layer) from an application to a receiver hardware (e.g., network interface 214) on the receiver device via the communication library of the receiver device. The RWQE may include an identifier associated with an SWQE (e.g., the SWQE1 330).

At block 404, the receiver device may determine a transmission rate (e.g., transmission rate 332) based on an available bandwidth and a number of transmitter devices associated with the one or more SWQEs. A transmission rate may be a rate by which data from an SWQE may be transmitted. The available bandwidth may be the maximum rate at which a computing device may transmit or receive over a network (e.g., network device 102). For example, the maximum bandwidth may be the maximum transmission capability of a NIC (e.g., NIC 215) of the receiver device, the maximum transmission capability of the network, or an agreed-upon predetermined bandwidth. A transmitter device may include one or more SWQEs that correspond to one or more RWQEs of the receiver device.

In some examples, the transmission rate may be evenly distributed among the SWQEs. For example, if the maximum transmission rate on a network is 1000 Gbps and there are 5 RWQEs associated with the receiver device, each SWQE corresponding to the RWQE may transmit at 200 Gbps. In some examples, the transmission rate may instead be determined based on weights assigned to the SWQE. Weights may be based on the duration that the WQE (e.g., SWQE and corresponding RWQE) has been active, the amount of data transmitted for the WQE, network conditions (e.g., network device failures and/or link failures), and any other characteristic regarding the WQE.

At block 406, the receiver device (e.g., the receiver device 304) may transmit a rate control notification (RCN) message (e.g., RCN 350 and RCN 352) to a transmitter device (e.g., transmitter2 308 and transmitter3 302) associated with an SWQE (e.g., SWQE2 340, SWQE3 344a, and SWQE4 348a) of the one or more SWQEs. The rate control notification message comprises the determined transmission rate may be transmitted to the SWQEs (e.g., advertised to all, or a subset of, SWQEs). The receiver device may then receive messages at the determined transmission rate from one or more SWQEs associated with one or more transmitter devices.

In one or more embodiments, the transmission rate may be periodically updated. For each period of time, an updated transmission rate (e.g., second transmission rate 333) may be calculated. RCNs (e.g., RCN 350, RCN 352, and RCN 354) may be sent to transmitter devices (e.g., the transmitter1 306, transmitter2 308, and transmitter3 302) for the transmitter devices to update their transmission rates to the updated transmission rate.

In one or more embodiments, the transmission rate may be updated when an SWQE is completed (e.g., a lack of messages). The receiver device may be notified by a transmitter device that an SWQE is completed during transmission from the SWQE. If an SWQE is completed (e.g., SWQE3 344b and SWQE4 348b), the completed SWQE and/or the corresponding RWQE (e.g., RWQE3 342b and RWQE4 346b) may be removed from the transmitter device and/or the receiver device, respectively. In FIG. 3, SWQE3 344b and SWQE4 348b and RWQE3 342b and RWQE4 346b are struck through to indicate their completion. Once removed, the transmission rate may be updated by the receiver device (e.g., third transmission rate 365). Then, RCNs (e.g., RCN 367 and RCN 369) may be sent to transmitter devices (e.g., transmitter1 306 and transmitter2 308) for the transmitter devices to update their transmission rates to the updated transmission rate. The receiver device may then receive messages at the updated transmission rate from one or more SWQEs associated with one or more transmitter devices.

In an instance in which there may be an RCN drop (e.g., the RCN message does not arrive at its destination), the receiver device may provide a recovery mechanism for a transmitter device to derive the transmission rate by resending an RCN message, which may allow the adjustment of bandwidth between transmitter devices to remain efficient, utilizing only half of a round trip time to set a new transmission rate at the transmitter devices. The messages (e.g., data packets) between transmitter device and receiver device may include an indication (e.g., a rate divider) of the current rate at which the transmission is set. In an instance in which the receiver device notices a mismatch between the transmission rate (e.g., the transmission rate advertised by the last RCN message) and the indication of the current rate, the receiver device may re-transmit the RCN message. For example, consider a transmitter device has a transmission rate of 400 Gbps and may not receive the RCN message indicating a new transmission rate of 200 Gbps. In this regard, when the receiver device receives a message from the transmitter device, the receiver device may compare a header of the message to analyze the indication of the transmission rate of the message. In an instance in which the header indicates that the transmitter device's transmission rate is 400 Gbps, the receiver device may re-transmit the RCN message to the transmitter device.

The indication may be used at a receiver device to monitor for any transmitter devices that may not be confirming the previous RCN (e.g., failing to confirm receipt of a prior RCN and thus failing to update their transmission rate). In an instance in which any such transmitter devices are detected, a receiver device may re-transmit another RCN with the latest transmission rate. The indication may also be used at a transmitter device to determine whether the transmitter device's current transmission rate is accurate by deriving, via the indication, the current optimal transmission rate from a receiver device.

The indication may also or instead be a rate divider. One or more data packets may have a header storing the current rate divider, which is the number of active WQEs (e.g., a pair of SWQE and RWQE). The rate divider may be used to derive, based on the NIC speed of the transmitter device, the transmission rate (e.g., transmission rate 332) that should have been included in an RCN (e.g., RCN 334).

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned differently) without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged or that all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

As used in this specification and any claims of this application, the terms "base station," "receiver," "transmitter," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole rather than each member of the list (i.e., each item). The phrase "at least one of" does not require the selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject but, rather, are intended to be used interchangeably. In one or more embodiments, a processor configured to monitor and control an operation, or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some embodiments, one or more embodiments, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations or one or more configurations. A disclosure relating to such phrase(s) may provide one or more examples. A phrase such as an aspect or some aspects may refer to one or more aspects and vice versa, which applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine (e.g., her) and vice versa. Headings and subheadings, if any, are used for convenience only and do not limit the subject disclosure.

What is claimed is:

1. A method comprising:
    accessing one or more receive work queue entities (RWQEs) associated with one or more send work queue entities (SWQEs);
    determining a transmission rate based on an available bandwidth and a number of transmitter devices associated with the one or more SWQEs;
    transmitting a rate control notification (RCN) message to a transmitter device associated with a send work queue entity of the one or more SWQEs, wherein the rate control notification message comprises the determined transmission rate;
    receiving, from the one or more SWQEs associated with the transmitter device, a message at the determined transmission rate;
    deriving a second transmission rate based on the message; and
    re-transmitting an RCN message to the transmitter device in response to the second transmission rate being different than the determined transmission rate.

2. The method of claim 1, wherein the accessing the one or more RWQEs comprises:
    posting, from an application layer to a hardware layer via a communication library layer, the one or more RWQEs, wherein the one or more RWQEs comprise one or more identifiers associated with the one or more SWQEs.

3. The method of claim 1, further comprising:
    removing from the one or more RWQEs a receive work queue entity, in response to the receive work queue entity indicating completion;
    removing from the one or more SWQEs a send work queue entity associated with the receive work queue entity, in response to the receive work queue entity indicating completion;
    determining a new transmission rate based on the available bandwidth and the number of transmitter devices; and
    transmitting one or more second RCN messages to the transmitter device, wherein the one or more second RCN messages comprise the new transmission rate.

4. The method of claim 3, further comprising:
    receiving, from another send work queue entity associated with the transmitter device, a message at the new transmission rate.

5. The method of claim 1, wherein the transmission rate is evenly distributed within the one or more SWQEs.

6. The method of claim 1, wherein the available bandwidth comprises a bandwidth of a receiver device associated with the one or more RWQEs.

7. An apparatus comprising:
one or more processors; and
at least one memory storing instructions, that when executed by the one or more processors, cause the apparatus to:
  access one or more receive work queue entities (RWQEs) associated with one or more send work queue entities (SWQEs);
  determine a transmission rate based on an available bandwidth and a number of transmitter devices associated with the one or more SWQEs;
  transmit a rate control notification (RCN) message to a transmitter device associated with a send work queue entity of the one or more SWQEs, wherein the rate control notification message comprises the determined transmission rate;
  remove from the one or more RWQEs a receive work queue entity, in response to the receive work queue entity indicating completion;
  remove from the one or more SWQEs a send work queue entity associated with the receive work queue entity, in response to the receive work queue entity indicating completion;
  determine a new transmission rate based on the available bandwidth and the number of transmitter devices; and
  transmit one or more second RCN messages to the transmitter device, wherein the one or more second RCN messages comprise the new transmission rate.

8. The apparatus of claim 7, wherein when the one or more processors further execute the instructions, the one or more processors cause the apparatus to:
  perform the access the one or more RWQEs by:
    post, from an application layer to a hardware layer via a communication library layer, the one or more RWQEs, wherein the one or more RWQEs comprise one or more identifiers associated with the one or more SWQEs.

9. The apparatus of claim 7, wherein when the one or more processors further execute the instructions, the one or more processors cause the apparatus to:
  receive, from the one or more SWQEs associated with the transmitter device, a message at the determined transmission rate.

10. The apparatus of claim 9, wherein when the one or more processors further execute the instructions, the one or more processors cause the apparatus to:
  derive a second transmission rate based on the message; and
  re-transmit an RCN message to the transmitter device in response to the second transmission rate being different than the determined transmission rate.

11. The apparatus of claim 7, wherein when the one or more processors further execute the instructions, the one or more processors cause the apparatus to:
  receive, from another send work queue entity associated with the transmitter device, a message at the new transmission rate.

12. The apparatus of claim 7, wherein the transmission rate is evenly distributed within the one or more SWQEs.

13. The apparatus of claim 7, wherein the available bandwidth comprises a bandwidth of a receiver device associated with the one or more RWQEs.

14. A computer-readable medium storing instructions that, when executed, cause:
  accessing one or more receive work queue entities (RWQEs) associated with one or more send work queue entities (SWQEs);
  determining a transmission rate based on an available bandwidth and a number of transmitter devices associated with the one or more SWQEs;
  transmitting a rate control notification (RCN) message to a transmitter device associated with a send work queue entity of the one or more SWQEs, wherein the rate control notification message comprises the determined transmission rate;
  receiving, from the one or more SWQEs associated with the transmitter device, a message at the determined transmission rate;
  deriving a second transmission rate based on the message; and
  re-transmitting an RCN message to the transmitter device in response to the second transmission rate being different than the determined transmission rate.

15. The computer-readable medium of claim 14, wherein the instructions, when executed, further cause:
  receiving, from the one or more SWQEs associated with the transmitter device, a message at the determined transmission rate.

16. The computer-readable medium of claim 15, wherein the instructions, when executed, further cause:
  deriving a second transmission rate based on the message; and
  re-transmitting an RCN message to the transmitter device in response to the second transmission rate being different than the determined transmission rate.

17. The computer-readable medium of claim 14, wherein the instructions, when executed, further cause:
  removing from the one or more RWQEs a receive work queue entity, in response to the receive work queue entity indicating completion;
  removing from the one or more SWQEs a send work queue entity associated with the receive work queue entity, in response to the receive work queue entity indicating completion;
  determining a new transmission rate based on the available bandwidth and the number of transmitter devices; and
  transmitting one or more second RCN messages to the transmitter device, wherein the one or more second RCN messages comprise the new transmission rate.

* * * * *